March 11, 1969  A. C. DE MATTIA  3,431,650

NAVIGATIONAL PLOTTING AND CALCULATING DEVICE

Filed June 10, 1966  Sheet 1 of 3

Albert C. DeMattia
INVENTOR.

Albert C. DeMattia
INVENTOR.

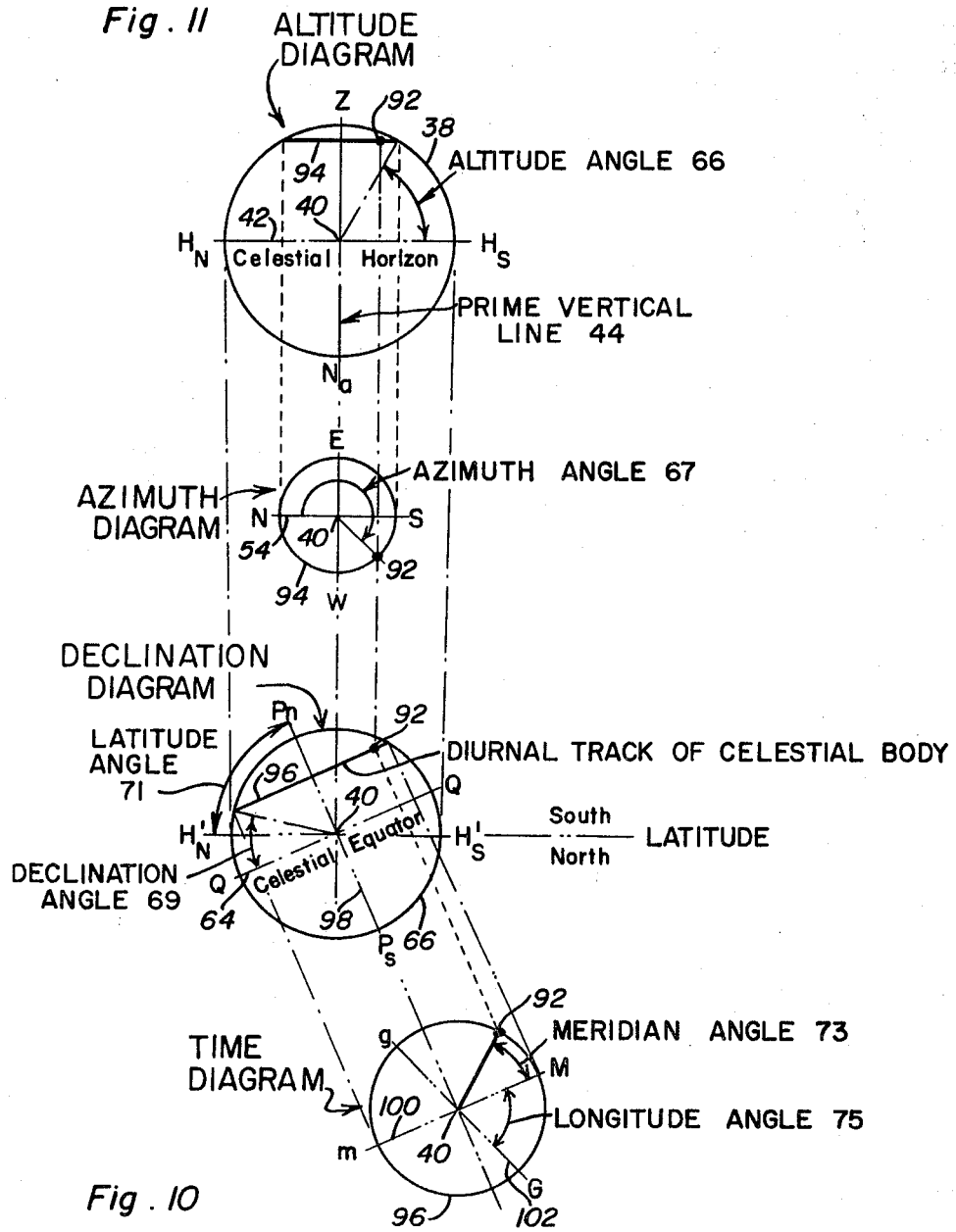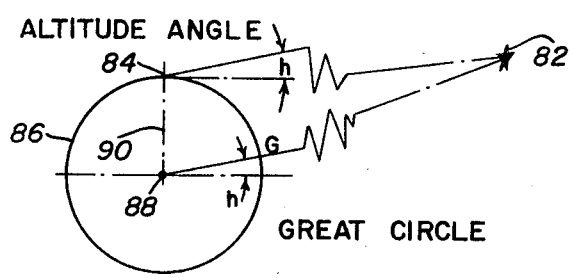

United States Patent Office 3,431,650
Patented Mar. 11, 1969

3,431,650
NAVIGATIONAL PLOTTING AND
CALCULATING DEVICE
Albert C. De Mattia, 5290 Newport Ave.,
Detroit, Mich. 48213
Filed June 10, 1966, Ser. No. 556,605
U.S. Cl. 33—1   8 Claims
Int. Cl. G01c 21/20

ABSTRACT OF THE DISCLOSURE

A graphical method of geographically locating points on the surface of the earth from optically sighted and published data on one or more celestial bodies by plotting different views of each celestial body on altitude or azimuth, declination and time diagrams by orthographic projection means. The latitude and longitude angles of the point from which sightings are taken is geographically determined from the angular position of the declination diagram and the projection of the celestial body on the time diagram.

---

This invention relates to a geometrical instrument or apparatus and a method associated therewith for locating points in space by orthographic projection.

The present invention is particularly useful in connection with the solution of navigational problems although not necessarily limited thereto. The invention involves a graphical method for solving geometric or trigometric problems and is based upon the orthographic projection principle wherein a point in space is located by its projection onto mutually perpendicular planes. The present invention differs however from prior graphical methods in that the orthographic projection planes are relatively rotatable about one or more corresponding reference points whereby any point in space may be more readily projected and plotted on the respective views. Accordingly, a primary object of the present invention is to facilitate the plotting of points in space on several views in order to establish the location thereof.

Another important object of the present invention in accordance with the foregoing object is to provide a rapid but accurate method for solving navigational problems from data obtained by optical sighting of celestial bodies and locational information regarding such celestial bodies obtained for example from an almanac or navigational tables.

The method and apparatus of the present invention will not only replace the use of calculating tables or mathematical operations for the solution of various navigational problems but will also permit the use of pre-plotted information in order to periodically obtain a rapid and accurate fix of one's location during marine or air travel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 10 is a diagrammatic view showing certain relationships utilized in the method of the present invention.

FIGURE 11 is a diagrammatic view of the relationships between the various discs associated with the apparatus of the present invention and illustrating the principles of the method involved.

Figure 1:
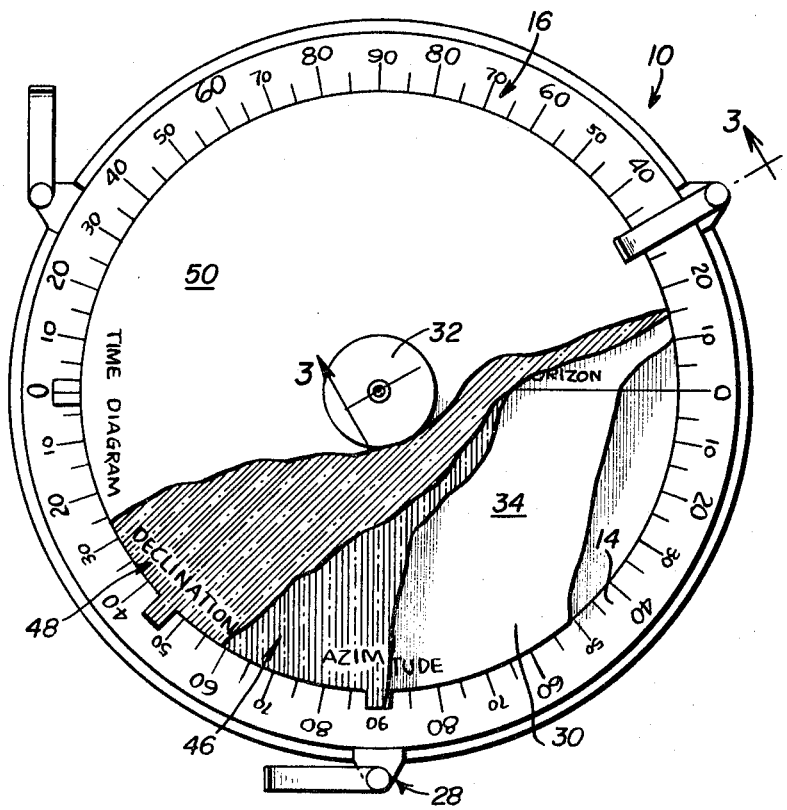
FIGURE 1 is a top plan view of the apparatus of the present invention with parts broken away.
Figure 2:
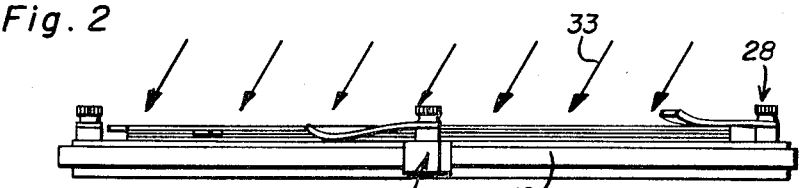
FIGURE 2 is a side elevational view of the apparatus shown in FIGURE 1.
Figure 3:
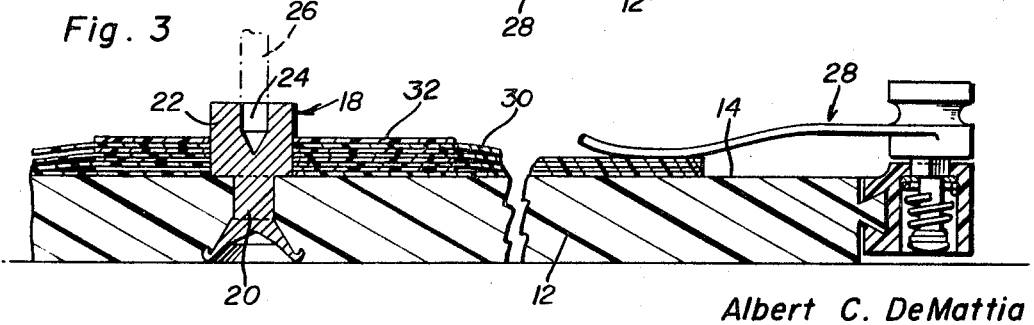
FIGURE 3 is an enlarged partial sectional view taken substantially through a plane indicated by section line 3—3 in FIGURE 1.

As hereinbefore indicated, the apparatus of the present invention is utilized to solve navigational problems by a graphical method based upon orthographic projections such as utilized in mechanical drawings but differing therefrom in that the various views of any point to be located are angularly displaceable relative to each other about one or more reference points. As shown in FIGURES 1, 2 and 3, the apparatus generally referred to by reference numeral 10 includes a relatively rigid base made of a suitable material having a flat backing surface 14 on which a circular protractor scale 16 is formed in any suitable manner as by printing. The surface 14 supports for angular movement thereon, a plurality of relatively thin disc members which are removably mounted for rotation about the common axis established by the pivot member 18 secured to the base 12. The pivot member may be made of a suitable material such as brass having a portion 20 anchored within the base and a projecting portion 22 received through aligned apertures in the disc members for rotatable mounting thereof. An anchor recess 24 may be formed in the pivot member so as to receive the anchor point 26 of a bar compass for example rotatable thereby about the common axis aforementioned. Also, in one form of apparatus constructed in accordance with the present invention, holding devices 28 may be mounted by the base and adjustably positioned about its outer periphery for releasably holding one or more of the disc members in an angularly adjusted position on the base. It will of course be appreciated that other temporary holding facilities could be utilized in order to firmly hold the disc members in position while information is being plotted thereon.

Each of the disc members is similar in construction in that it is made of a translucent material having a writing surface 30 on which information may be plotted by pencil for example utilizing a straight edge and compass as aforementioned. The surface 30 is also of such nature that information written thereon may be readily erased. The central portion of each disc member may also be provided with a reinforcement 32 as shown in FIGURE 3 surrounding a central aperture through which the projecting portion 22 of the pivot member 18 extends. Also, the disc members are relatively thin so as to avoid refraction error during use of the apparatus which must be suitably illuminated by a source of collimated light as indicated by the light rays 33 in FIGURE 2.

Figure 4:
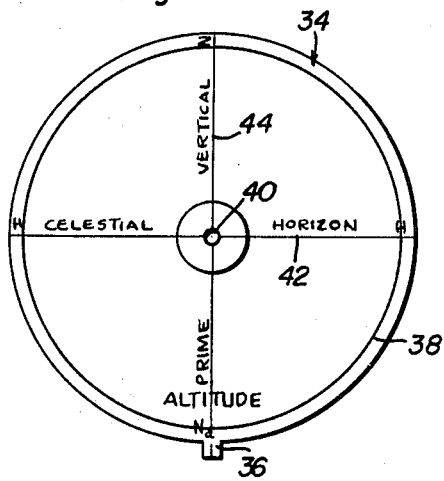
FIGURES 4, 5 and 6 are top plan views of the altitude, azimuth and declination diagram discs respectively, associated with the apparatus of the present invention.
Figure 5:
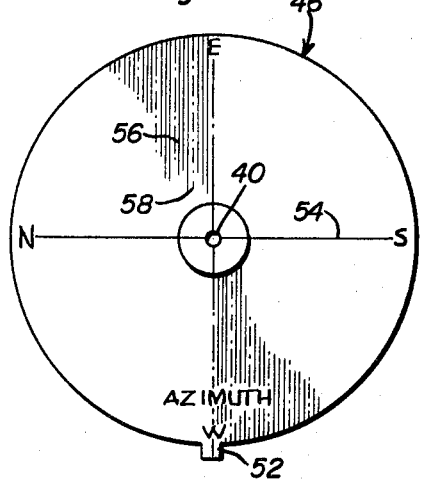
Figure 6:
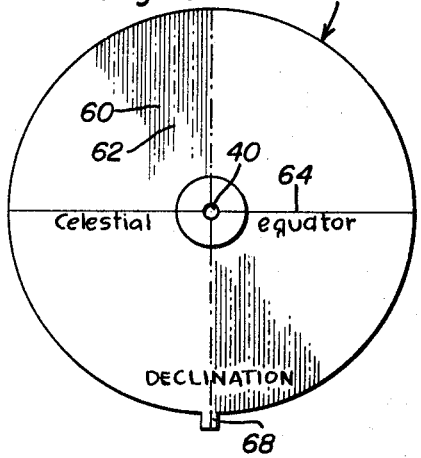
Figure 7:
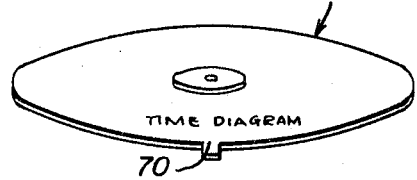
FIGURE 7 is a perspective view of the time diagram disc associated with the present invention.

The disc members are generally circular in shape and the number of such disc members associated with the apparatus may vary dependent upon the type or nature of the problems to be solved. Generally, however, the disc members include a disc member 34 as shown in FIGURE 4 on which an altitude diagram is formed as will be hereafter explained. The disc member 34 may be provided with a radially projecting tab 36 to facilitate its angular adjustment and may have a circle 38 formed thereon in any suitable manner representing the side view of a celestial sphere on which surface a celestial body lies. When the disc member 34 is placed on the base 12, the center of the circle 38 will coincide with the rotationa axis 40 established by the pivot member 18 which is intersected by a diametrical line 42 representing the celestial horizon from which the celestial body is sighted on the sphere represented by the circle 38. Another diametrical prime vertical line 44 perpendicular to the celestial horizon line 42, is also formed on the disc member 34 as shown in FIGURE 4. Also generally included amongst the disc members, are the disc members 46, 48 and 50 respectively shown in FIGURES 5, 6 and 7.

The disc member 46 presents a surface on which an azimuth diagram is formed representing a plan view of the celestial sphere aforementioned in connection with the altitude diagram on the disc member 34. When used, the azimuth disc member 46 will overlie the altitude disc member 34 and may be angularly adjusted relative thereto by means of the tab 52. A diameter line 54 intersecting the common axis 40 may also be formed on the writing surface of the disc member 46 between north and south poles as reference points. Also formed on the disc member 46 perpendicular to the reference line 54, are a plurality of equally spaced, parallel projection lines including solid lines 56 and dot-dash lines 58 as every fourth parallel line. The projection lines 56 and 58 facilitate the projection of points from one view to another as represented by the diagrams respectively plotted on the disc members 34 and 46.

The disc member 48 is also provided with projection lines 60 and 62 similar to the projection lines as described with respect to the disc member 46, the projection lines 60 and 62 being perpendicular to a diametrical line 64 representing the celestial equator of the celestial sphere. A declination diagram is plotted on the disc member 48 which is slightly larger in diameter than disc 34 so that the circle 38 will be visible therethrough and to form the side view of the celestial sphere. The declination disc member 48 is however angularly displaced relative to the altitude disc member 34 in accordance with the location of the point from which the celestial body is sighted while the projection lines 60 and 62 facilitate the projection of points onto a time diagram formed on the circular disc member 50 adapted to overlie the disc member 48. The disc members 48 and 50 are therefore also provided with tabs 68 and 70.

Figure 8:
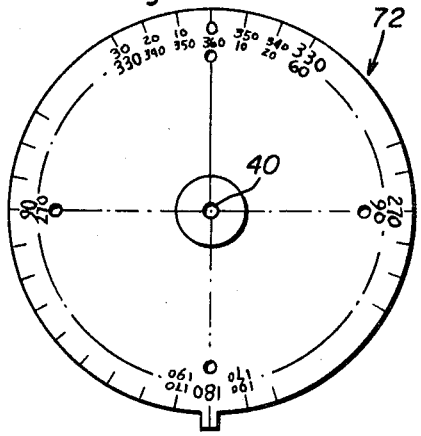
FIGURE 8 is a top plan view of a protractor disc associated with the apparatus.
Figure 9:
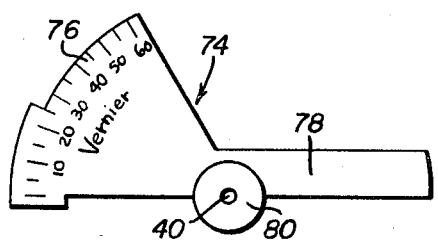
FIGURE 9 is a vernier scale member associated with the apparatus.

The apparatus 10 may also be provided with a protractor disc member 72 as shown in FIGURE 8 adapted to overlie the other disc members in order to measure angular distances between points thereon. In order to be able to measure fractional parts of angular degrees on the protractor scales associated with either the protractor disc member 72 or the protractor scale 16 on the base, a vernier member 74 is provided as shown in FIGURE 9 which includes a sector scale portion 76 having calibrations equal to 1 minute of an arc and a straight edge portion 78 on opposite sides of the central portion 80 through which the pivot member 18 projects. The venier member 74 is utilized in a manner well known to those skilled in the art by mounting the central portion 80 on the pivot member 18 and aligning the zero mark with a location on the scale of the protractor. When removed from the pivot member 18, the straight edge portion 78 of the vernier member 74 may be utilized to draw straight lines on any of the writing surfaces 30 of the disc members for plotting purposes.

As hereinbefore indicated, the altitude and declination diagrams plotted on the disc members 34 and 48 represent a side view of the celestial sphere looking from west to east on which celestial bodies are located in connection with the solution of navigational problems. The azimuth diagram formed on the disc member 46 on the other hand is a top plan view of the celestial sphere while the time diagram represents an end view of the same celestial sphere looking from the south celestial pole. In this solution of navigational problems, a common point or axis may be selected for the respective disc members because of the tremendous distances between celestial bodies and the earth from which these bodies are sighted. Referring for example to FIGURE 10, it will be observed that a celestial body 82 will be at a great distance from a location 84 on the surface of the earth from which the body 82 is sighted. The altitude angle $h$ between the line of sight to body 82 and the tangent to the great circle 86 at the point 84, will therefore be substantially equal to the angle formed between the line extending from the center 88 to the body 82 and the line perpendicular to the radial distance 90 between the center 88 and the point 84 on the circle. Thus, it will be appreciated that polar coordinates utilized to locate any point in space may be regarded as originating from the center of the great circle on which a point is located even though these actually originate from a point on the great circle.

There are five principal coordinates by means of which a point on the surface of the earth is located by sighting celestial bodies. These coordinates include altitude, declination, latitude, meridian angle and azimuth. If any three of the latter five coordinates are known, the other two coordinates may be obtained by calculation or by the graphical method of the present invention. Altitude and azimuth may be obtained by optical sighting on a celestial body while declination and meridian angle may be obtained from published data with regard to any celestial body for a given date.

By use of a sextant, a celestial body may be sighted and located with reference to the point on the earth from which the sighting is taken by means of altitude and azimuth coordinates, wherein the altitude angle is the vertical angle between the line of sight and the celestial horizon and the azimuth angle is the angular distance from the polar reference line. Thus, as shown in FIGURE 11 the celestial body being sighted will appear as a point 92 plotted on the disc member 34 showing the celestial sphere represented in side view by the circle 38 of the altitude diagram. The point 92 on the surface of the sphere will also be on an azimuth circle 94 plotted on the disc member 46 shown in side view as a chord of the circle 38 on the altitude diagram, so that the corrected altitude angle is the angle 66 between the celestial horizon line 42 and the line connecting the axis 40 with the intersection between the side view of the azimuth circle and the circle 38. In the azimuth diagram, the azimuth circle 94 appears in a plan view of the celestial sphere or in a plane perpendicular to the prime vertical line 44. The point 92 therefore appears in the azimuth diagram on the circle 94 spaced from the polar reference line 54 by the measured azimuth angle 67. The point 92 may be readily projected between the altitude and azimuth diagrams which overlie each other after angularly adjusting the altitude and azimuth discs 34 and 48 so that the lines 42 and 54 coincide with each other always in a horizontal position.

With continued reference to FIGURE 11, it will be noted that the same celestial body is plotted as point 92 on the declination diagram of disc member 48, the circle 38' of which is circle 38 on disc member 34 viewed through the overlying disc member 48. From information obtained from an almanac, for a given date, the side view of the diurnal track 96 of the celestial body may be plotted, this being the path of movement of the point 92 relative to the earth as the earth rotates about its polar axis represented by diametrical line 98 perpendicular to the celestial equator line 64. The diurnal track is plotted from the declination angle associated with the celestial body which is the angle 69 between the celestial equator line and the line extending from the common axis and the intersection between the side view of the diurnal track and the circle 38'. For celestial bodies outside the solar system, the diurnal track remains the same, while a change in the track occurs during certain seasons with respect to bodies such as the moon, sun and planets inside of the solar system. When the declination diagram is angularly rotated about the common axis 40 so that the polar line 98 is at an angle 71 to the celestial horizon line 42 of the altitude diagram equal to the north latitude angle of the position from which the celestial body is sighted in the example illustrated, the plotted position of the celestial body on the declination diagram will coincide with the plotted position of the celestial body on the altitude diagram. If the poles at the end of polar line 98 were reversed the angle 71 would be the south latitude angle. When the point 92 as plotted on the declination diagram is projected onto the time diagram it will appear on the diurnal circle 96 shown in end view on the time diagram. The position of the point 92 on the time diagram is obtained from the relationship of the meridian angle and longitude angle to the plotted local meridian line 100 which coincides with the celestial equator line 64 on the declination diagram and corresponds to the plotted reference line 102. The Greenwich Hour Angle which is the sum of the meridian angle 73 and longitude angle 75 for any celestial body is obtained from an almanac for a given date. The meridan angle 73 will vary with time while the longitude angle 75 will depend on the location from which a celestial body is sighted.

It will be appreciated from the foregoing, that the projection lines formed on the azimuth and declination discs facilitate projection of points to and from the altitude and time diagrams. Also, by angularly orientating the declination diagram relative to the altitude diagram until the different plots of the same celestial body coincide, a complete solution is obtained for any navigational problem presented. For example, two different celestial bodies may be optically sighted from the same position and respectively plotted on the altitude and declination diagrams as aforementioned in connection with point 92. Since both celestial bodies were sighted from the same location, they will be angularly located on the time diagram from the same reference line 102 because the longitude angle 75 will be the same for both bodies even though the meridian angle changes with time. Accordingly, the declination disc member 48 on which the declination diagram is plotted is angularly rotated relative to the altitude diagram on the disc member 34 until both points projected on the declination diagram from the altitude diagram will correspondingly project onto the time diagram with respect to a common reference line such as the reference line 102 shown in FIGURE 11. The latitude and longitude angles may then be measured from the declination and time diagrams, in order to locate the point from which the optical sightings of the celestial bodies were taken.

The location of a point on the surface of the earth may also be located by sighting on the same celestial body at different times. In such case, both sightings will produce different points plotted on the same diurnal track rather than separate diurnal circles as in the case of sighting two different celestial bodies as aforementioned in connection with the previous problem. Accordingly, in the latter problem the declination and time diagrams are angularly rotated relative to the altitude and azimuth diagrams until the two points projected from the altitude and azimuth diagrams fall on the same diurnal track of the declination and time diagrams. Many other types of problems may also be solved using all or part of the apparatus described.

It will be apparent therefore, that the graphical method utilized will require the drawing of azimuth circles, diurnal tracks, angle lines and points on the writing surfaces 30 of the disc members to form the various diagrams. After completion of each problem, the writing surfaces may be erased. Alternatively, special disc members could be prepared in connection with the respective diagrams containing partial solutions for problems to be completed at periodic intervals when additional data is made available from periodic sightings. The graphical method could also be used to rapidly verify other calculating methods and as a teaching aid.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A method for locating points in space comprising the steps of: establishing a projection representing the center of a sphere on which one of said points is located; plotting the location of said one of the points on a plane surface by coordinates rotatable about said projection of the center of the sphere in orthographic projection planes; plotting the location of said one of the points by coordinates on another plane surface rotatable about another of said points in orthographic projection planes; and angularly orientating the plane surfaces on which said one of the points are plotted about a common axis coinciding with said projection of the center of the sphere and said other of the points until said plotted points on the plane surfaces coincide.

2. The method of claim 1 wherein said one of the points is located on projections of circular tracks circumscribed by said sphere viewed on the plane surfaces as circles of equal diameter on two of the plane surfaces which are angularly orientated about said axis.

3. The method of claim 2 wherein the location of said other of the points is a function of the angular displacement between said plane surfaces are are angularly orientated.

4. The method of claim 3 wherein said one of the points represents a celestial body, the coordinates of which are altitude and azimuth angles obtained by optically sighting on said celestial body from said other of the points which represents a location on the surface of the earth.

5. The method of claim 1 wherein said one of the points represents a celestial body, the coordinates of which are altitude and azimuth angles obtained by optically sighting on said celestial body from said other of the points which represents a location on the surface of the earth.

6. A method of determining the latitude and longitude angles of an unknown location on the surface of the earth by optically sighting celestial bodies having known declination and hour angles including the steps of: drawing at least three diagrams of a celestial sphere on plane surfaces representing orthographic projections of a spherical surface on which at least one of the celestial bodies is located; depicting a projection of said one of the celestial bodies on one of said diagrams relative to a celestial horizon from data obtained from said optical sighting; depicting projections of said one of the celestial bodies in perpendicular planes on the other two of the diagrams from the declination and hour angles; angularly rotating said latter two of the diagrams relative to said one of the diagrams about the center of the celestial sphere projections to orientated positions in which all of said projections of said one of the celestial bodies on the diagrams coincide; measuring the angle between said celestial horizon and equator depicted on the diagrams in said orientated positions thereof to obtain the latitude angle of said unknown location, said second of the diagrams depicting the projection of said one of the celestial bodies on a corresponding diurnal track represented as a chordal line located from the declination angle, the celestial equator being depicted on said second of the diagrams as a diametral line parallel to said chordal line, and said third of the diagrams depicting the projection of the one of the celestial bodies on a diurnal circle projected from the chordal line on said second diagram; and drawing a radial reference line from the center of the diurnal circle on the third diagrams angularly spaced from the projection of said one of the celestial bodies by an amount equal to the hour angle corresponding to said one of the celestial bodies.

7. The method of claim 6 further including the steps of: establishing another three diagrams corresponding to another of the celestial bodies optically sighted at substantially the same time from the same unknown location in accordance with the foregoing steps; and determining the longitude angle of said unknown location common to both of the third diagrams by measuring a common angle between the radial reference lines and local diametral meridian lines, said second and third diagrams corresponding to both of said celestial bodies being angularly rotated until said reference lines coincide to obtain said orientated positions.

8. The method of claim 6 further including the steps of establishing another three diagrams corresponding to the same one of the celestial bodies optically sighted from the same unknown location at a different time in accordance with the foregoing steps; both of said second and third diagrams corresponding to different times, being angularly rotated until the chordal lines on both of said second diagrams coincide to obtain said orientated positions; and measuring a common longitude angle on both of the third diagrams between the radial reference lines and local diametral meridian lines depicted on the third diagrams.

References Cited

UNITED STATES PATENTS

| | | |
|---|---|---|
| 2,105,103 | 1/1938 | Sinitzin-White. |
| 2,235,177 | 3/1941 | Stark. |
| 2,397,002 | 3/1946 | Hagner. |
| 2,407,893 | 9/1946 | Meyer. |
| 2,904,885 | 9/1959 | Wood _____ 33—75 X |
| 2,916,207 | 12/1959 | Vohland. |

WILLIAM D. MARTIN, JR., *Primary Examiner.*

U.S. Cl. X.R.

33—75